United States Patent
Yokoi et al.

(10) Patent No.: US 11,568,313 B2
(45) Date of Patent: Jan. 31, 2023

(54) CONTROL APPARATUS, ANALYSIS APPARATUS, COMMUNICATION SYSTEM, DATA PROCESSING METHOD, DATA TRANSMISSION METHOD, AND NON-TRANSITORY COMPUTER READABLE MEDIUM

(71) Applicant: NEC Corporation, Tokyo (JP)

(72) Inventors: Daisuke Yokoi, Tokyo (JP); Tadashi Ishikawa, Tokyo (JP); Takuya Itou, Tokyo (JP); Ichirou Akimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 16/769,382

(22) PCT Filed: Dec. 4, 2018

(86) PCT No.: PCT/JP2018/044466
§ 371 (c)(1),
(2) Date: Jun. 3, 2020

(87) PCT Pub. No.: WO2019/111867
PCT Pub. Date: Jun. 13, 2019

(65) Prior Publication Data
US 2021/0174250 A1 Jun. 10, 2021

(30) Foreign Application Priority Data
Dec. 7, 2017 (JP) .............................. JP2017-235194

(51) Int. Cl.
*G06N 20/00* (2019.01)
*G06F 11/34* (2006.01)

(52) U.S. Cl.
CPC ......... *G06N 20/00* (2019.01); *G06F 11/3442* (2013.01); *G06F 11/3447* (2013.01); *G06F 11/3452* (2013.01)

(58) Field of Classification Search
CPC . G06N 20/00; G06F 11/3442; G06F 11/3447; G06F 11/3452
See application file for complete search history.

(56) References Cited

U.S. PATENT DOCUMENTS

| 2015/0065121 A1* | 3/2015 | Gupta | H04W 28/04 455/424 |
| 2018/0096247 A1* | 4/2018 | Maruhashi | G06N 3/084 |

FOREIGN PATENT DOCUMENTS

| JP | 2009-212654 A | 9/2009 |
| JP | 2017-207894 A | 11/2017 |

OTHER PUBLICATIONS

International Search Report for PCT Application No. PCT/JP2018/044466, dated Feb. 5, 2019.

(Continued)

*Primary Examiner* — Masud K Khan

(57) ABSTRACT

An object of the present disclosure is to provide a control apparatus that controls a plurality of communication systems so that the plurality of communication systems can perform analysis with high accuracy. The control apparatus (30) according to the present disclosure includes a communication unit (31) and a determination unit (32). The communication unit (31) receives, from an analysis apparatus (10) configured to perform machine learning using communication logs collected from a communication apparatus in order to generate a learning model, statistical information about each of the communication logs and information about the learning model. The determination unit (32) determines an analysis apparatus (20) to which the information about the (Continued)

learning model is applied based on the statistical information.

17 Claims, 10 Drawing Sheets

(56) References Cited

OTHER PUBLICATIONS

Ishikawa, Masayoshi et al., "Research on Unsupervised Transfer Learning utilizing Clustering under Incomplete Dataset", IEICE Technical Report, vol. 116, No. 300, pp. 321-327, Nov. 9, 2016, Japan.

* cited by examiner

| ACQUISITION TIME | TRAFFIC VOLUME | AIR TEMPERATURE | TRAFFIC ATTRIBUTE | AIR TEMPERATURE ATTRIBUTE |
|---|---|---|---|---|
| 1:00 | 10Mbps | 15°C | −5Mbps | −5°C |
| 1:30 | 20Mbps | 18°C | +5Mbps | −2°C |
| 2:00 | 15Mbps | 20°C | REFERENCE | REFERENCE |
| 2:30 | 30Mbps | 15°C | +15Mbps | −5°C |

Fig. 4

CONTROL APPARATUS, ANALYSIS APPARATUS, COMMUNICATION SYSTEM, DATA PROCESSING METHOD, DATA TRANSMISSION METHOD, AND NON-TRANSITORY COMPUTER READABLE MEDIUM

This application is a National Stage Entry of PCT/JP2018/044466 filed on Dec. 4, 2018, which claims priority from Japanese Patent Application 2017-235194 filed on Dec. 7, 2017, the contents of all of which are incorporated herein by reference, in their entirety.

TECHNICAL FIELD

The present disclosure relates to a control apparatus, an analysis apparatus, a communication system, a data processing method, a data transmission method, and a program.

BACKGROUND ART

In recent years, a service for generating prediction data and the like by analyzing an enormous amount of data and providing the generated prediction data has been examined. For the analysis of an enormous amount of data, for example, machine learning is used. Data processing using machine learning is completed earlier than when a person performs data processing. Thus, by using machine learning or the like, it is possible to quickly process an enormous amount of data.

For example, Patent Literature 1 discloses an evaluation system that can determine the quality of the current facilities at a certain time point in the future while situations such as occurrences of failures that have not occurred so far and an increase in the number of users are assumed.

CITATION LIST

Patent Literature

Patent Literature 1: Japanese Unexamined Patent Application Publication No. 2009-212654

SUMMARY OF INVENTION

Technical Problem

Patent Literature 1 discloses that an evaluation system determines the quality of the current facility at a certain time point in the future in regard to one communication system. Meanwhile, when the number of communication systems to be evaluated increases in the future, it is desired that an evaluation or analysis regarding a plurality of communication systems be efficiently performed. Therefore, it is conceivable that an evaluation method or an analysis method performed in a certain communication system is applied to other communication systems, and then each communication system efficiently performs an evaluation or an analysis. However, the communication systems have configurations different from each other. This causes a problem in which the possibility of obtaining an appropriate analysis result is reduced even if the analysis method performed in a certain communication system is applied to other communication systems.

The present disclosure has been made in view of the aforementioned problem and an object thereof is to provide a control apparatus, an analysis apparatus, a communication system, a data processing method, a data transmission method, and a program that control a plurality of communication systems so that the plurality of communication systems can perform an analysis with high accuracy.

Solution to Problem

A control apparatus according to a first aspect of the present disclosure includes:

a communication unit configured to receive, from a first analysis apparatus configured to perform machine learning using communication logs collected from a communication apparatus in order to generate a learning model, statistical information about each of the communication logs and information about the learning model; and a determination unit configured to determine a second analysis apparatus to which the information about the learning model is applied based on the statistical information.

An analysis apparatus according to a second aspect of the present disclosure includes:

a learning model generation unit configured to perform machine learning using collected communication logs to thereby generate a learning model; and a communication unit configured to transmit, to a control apparatus configured to determine an analysis apparatus to which information about the learning model is applied based on statistical information about each of the communication logs, the statistical information and the information about the learning model.

A communication system according to a third aspect of the present disclosure includes:

a first analysis apparatus configured to perform machine learning using collected communication logs to thereby generate a learning model; and a control apparatus configured to receive statistical information about each of the communication logs and information about the learning model from the first analysis apparatus and determine a second analysis apparatus to which the information about the learning model is applied based on the statistical information.

A data processing method according to a fourth aspect of the present disclosure includes:

receiving, from a first analysis apparatus that has performed machine learning using communication logs collected from a communication apparatus to thereby generate a learning model, statistical information about each of the communication logs and information about the learning model; and determining a second analysis apparatus to which the information about the learning model is applied based on the statistical information.

A data transmission method according to a fifth aspect of the present disclosure includes:

performing machine learning using collected communication logs to thereby generate a learning model; and transmitting, to a control apparatus configured to determine an analysis apparatus to which information about the learning model is applied based on statistical information about each of the communication logs, the statistical information and the information about the learning model.

A program according to a sixth aspect of the present disclosure causes a computer to perform the following processing of:

receiving, from a first analysis apparatus that has generated a learning model as a result of machine learning using communication logs collected from a communication apparatus, statistical information about each of the communication logs and information about the learning model; and determining a second analysis apparatus to which the information about the learning model is applied based on the statistical information.

Advantageous Effects of Invention

According to the present disclosure, it is possible to provide a control apparatus, an analysis apparatus, a communication system, a data processing method, a data transmission method, and a program that control a plurality of communication systems so that the plurality of communication systems can perform an analysis with high accuracy.

BRIEF DESCRIPTION OF DRAWINGS

FIG. 4 is a diagram for explaining generation of attributes performed by a learning model generation unit according to the second example embodiment;

DESCRIPTION OF EMBODIMENTS

First Example Embodiment

Figure 1:
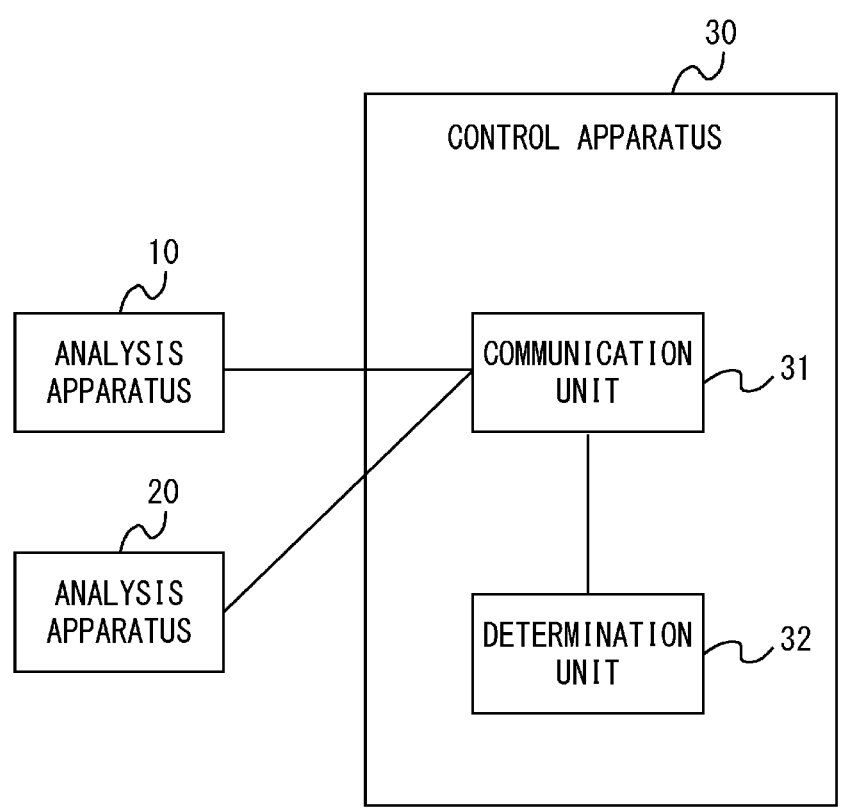
FIG. 1 is a configuration diagram of a communication system according to a first example embodiment.

Hereinafter, with reference to the drawings, example embodiments of the present disclosure will be described. A configuration example of a communication system according to a first example embodiment is described with reference to FIG. 1. The communication system shown in FIG. 1 includes an analysis apparatus 10, an analysis apparatus 20, and a control apparatus 30.

The analysis apparatuses 10 and 20 and the control unit 30 may be computer apparatuses, each of which operates by a processor executing a program stored in a memory. The analysis apparatuses 10 and 20 and the control unit 30 may each be, for example, a personal computer or a server apparatus.

The analysis apparatus 10 performs machine learning using communication logs collected from the communication apparatus in order to generate a learning model. The learning model may be a model used to predict traffic data in the communication system. That is, the learning model may be a model used to derive prediction data. Alternatively, the learning model may be a model used to analyze collected communication logs. That is, the learning model may be a model used to derive an analysis result based on the collected communication logs. The learning model may also be referred to as, for example, a prediction model. Further, the learning model may include a plurality of learning expressions or a plurality of prediction expressions.

The communication system includes, for example, analysis apparatuses, communication apparatuses, or communication nodes. The communication system may be, for example, an access network system such as an optical communication network or a radio network. Alternatively, the communication system may be a backbone network system that relays data transmitted from the access network system. Alternatively, the communication system may be a system including the access network and the backbone network system. The backbone network system may also be referred to as, for example, a core network system.

The traffic data may be, for example, data indicating the traffic volume or the amount of data transmitted between the communication apparatuses or in the communication system. The term "in the communication system" means the entire communication system including a plurality of communication apparatuses. For example, the traffic data between the communication apparatuses may be traffic data for each communication apparatus in the communication system. Further, the traffic data in the entire communication system may be the sum total of the traffic data between the communication apparatuses.

Alternatively, the traffic data may be the number of sessions configured or established between the communication apparatuses or in the communication system. Alternatively, the traffic data may be the number of communication terminals using the communication apparatus or the communication system. In other words, the traffic data may be the number of communication terminals connected to the communication apparatus or the communication system and may be the number of communication terminals managed in the communication apparatus or the communication system. Alternatively, the traffic data includes at least one of the traffic volume, the amount of data, the number of sessions, and the number of communication terminals, and may be data obtained by combining two or more elements among the traffic volume, the amount of data, the number of sessions, and the number of communication terminals. Further, the number of communication terminals may also be referred to as the number of users.

Like the analysis apparatus 10, the analysis apparatus 20 performs machine learning using communication logs collected from the communication apparatus in order to generate a learning model.

Next, a configuration example of the control apparatus 30 is described. The control apparatus 30 includes a communication unit 31 and a determination unit 32. Each of the communication unit 31 and the determination unit 32 may be software or a module, the processing of which is performed by a processor executing a program stored in a memory. Alternatively, the communication unit 31 and the determination unit 32 may be hardware such as circuits or chips.

The communication unit 31 receives, from the analysis apparatus 10, statistical information about communication logs collected by the analysis apparatus 10 and information about a learning model generated by the analysis apparatus 10. The statistical information is information calculated by performing statistical processing on a large number of communication logs collected by the analysis apparatus 10. The statistical information may be numerical data such as an average value of the value indicated by each of the communication logs or may be data indicating a tendency of the value indicated by each of the communication logs. The tendency may be, for example, an increasing tendency or a decreasing tendency.

The information about the learning model may be, for example, a generated learning model, or may be information indicating input data, or input parameters and the like used for machine learning in the analysis apparatus 10.

The determination unit 32 determines an analysis apparatus to which the information about the learning model received from the analysis apparatus 10 is applied based on the statistical information. For example, the determination unit 32 may select, as an analysis apparatus to which the information about the learning model received from the analysis apparatus 10 is applied, the analysis apparatus 20 having statistical information indicating a tendency similar to that of the statistical information received from the analysis apparatus 10.

It is assumed that the analysis apparatus 20 has statistical information indicating a tendency similar to that of the statistical information of the analysis apparatus 10. In this case, the analysis apparatus 20 can generate a learning model having an accuracy similar to that of the analysis apparatus 10 by the information about the learning model generated by the analysis apparatus 10 being applied to the analysis apparatus 20.

As described above, the analysis apparatus 20 can efficiently obtain an analysis result having an accuracy equivalent to that of the analysis result obtained by the analysis apparatus 10 by using the information and the like that have been used to obtain an analysis result in the analysis apparatus 10. In other words, the analysis apparatus 20 can efficiently obtain an analysis result having a high accuracy without having to go through a procedure for specifying input data and the like used for machine learning, in order to obtain an analysis result having a high accuracy. The procedure for specifying input data and the like includes, for example, performing machine learning on a trial basis using input data selected from a plurality of input data items and verifying the accuracy of a result of the learning. It should be noted that when the analysis apparatus 10 obtains an analysis result having a high accuracy, it is desired that the information about the learning model generated by the analysis apparatus 10 be applied to the analysis apparatus 20. The high accuracy may be an accuracy that exceeds a predetermined reference. Alternatively, the high accuracy may be higher than the accuracy of the analysis result when the analysis apparatus 20 does not use the information or the like used to obtain an analysis result in the analysis apparatus 10.

Second Example Embodiment

Figure 2:
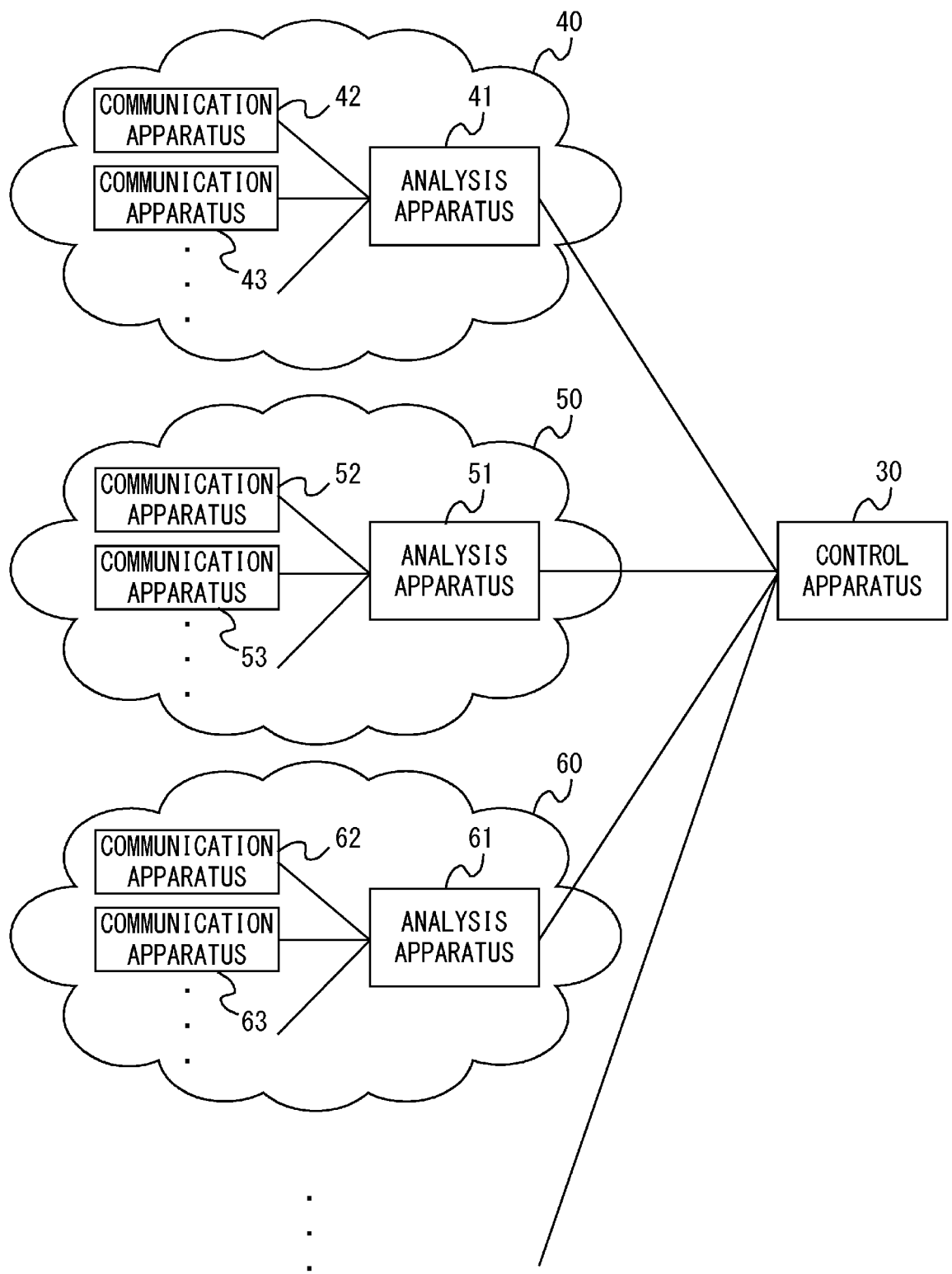
FIG. 2 is a configuration diagram of the communication system according to a second example embodiment.

Next, a configuration example of the communication system according to a second example embodiment is described with reference to FIG. 2. The control apparatus 30 shown in FIG. 2 corresponds to the control apparatus 30 shown in FIG. 1. The control apparatus 30 is connected to a communication system 40, a communication system 50, and a communication system 60. FIG. 2 shows a configuration in which control apparatus 30 is connected to three communication systems. However, the control apparatus 30 may be connected to one or more communication systems.

The control apparatus 30 manages each communication system so that an analysis of the communication log is performed, in each communication system, efficiently or with high accuracy.

The communication system 40 includes an analysis apparatus 41, a communication apparatus 42, and a communication apparatus 43. The analysis apparatus 41 corresponds to the analysis apparatus 10 or the analysis apparatus 20 shown in FIG. 1. The analysis apparatus 41 collects communication logs from the communication apparatuses 42 and 43. FIG. 2 shows a configuration in which the analysis apparatus 41 is connected to two communication apparatuses. However, the analysis apparatus 41 may be connected to three or more communication apparatuses. Further, one communication system may include a plurality of analysis apparatuses.

The communication apparatuses 42 and 43 may be, for example, base stations used in a mobile network, or may be core network apparatuses. The base station may be, for example, an evolved Node B (eNB) that supports Long Term Evolution (LTE) defined in the 3rd Generation Partnership Project (3GPP). Alternatively, the base station may be a Node B that supports the so-called 2G or 3G defined in the 3GPP.

The core network apparatus may be, for example, an apparatus that configures an Evolved Packet Core (EPC). The apparatus configuring the EPC may be, for example, a Mobility Management Entity (MME), a Serving Gateway (SGW), or a Packet Data Network Gateway (PGW).

Alternatively, the communication apparatuses 42 and 43 may be relay apparatuses that relay data transmitted between the base stations, between the core network apparatuses, or between the base station and the core network apparatus. The relay apparatus may be, for example, a transmission apparatus that configures a microwave radio communication system.

The communication system 50 includes an analysis apparatus 51, a communication apparatus 52, and a communication apparatus 53 like the configuration of the communication system 40. Further, the communication system 60 includes an analysis apparatus 61, a communication apparatus 62, and a communication apparatus 63 like the configuration of the communication system 40.

Figure 3:
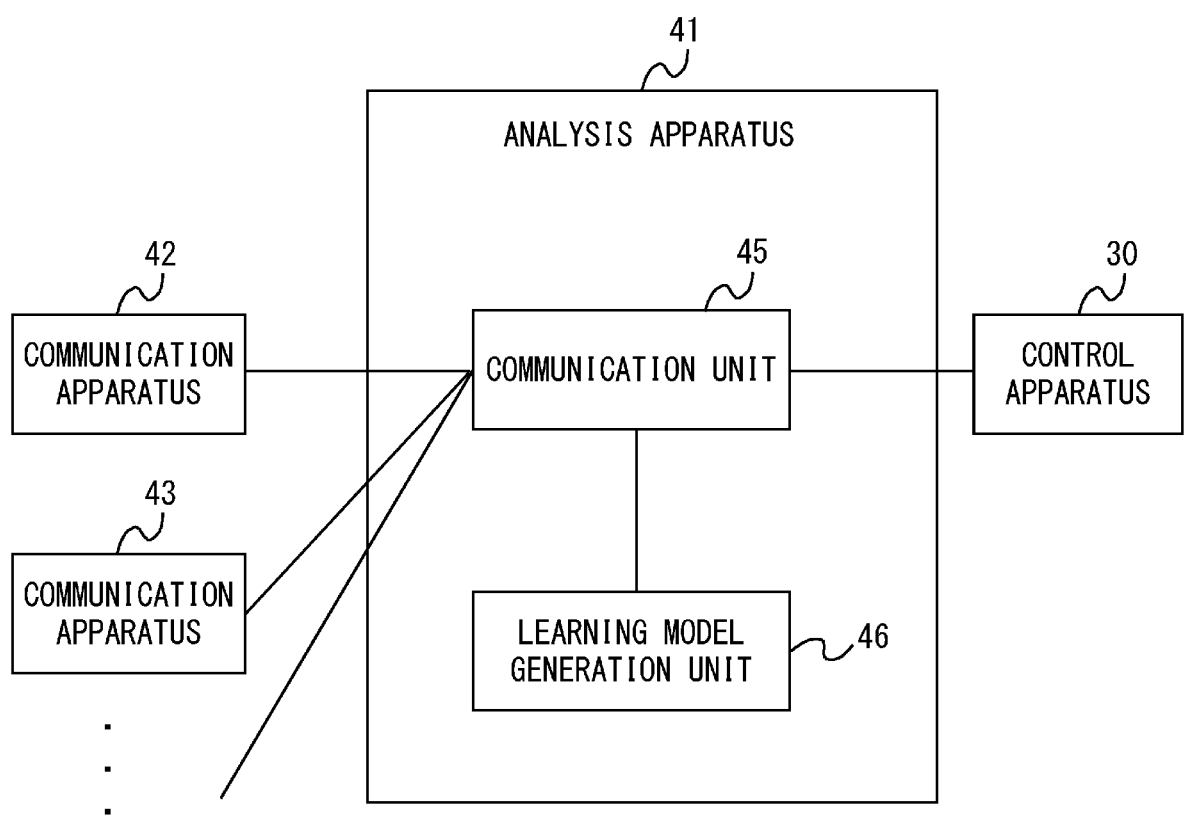
FIG. 3 is a configuration diagram of an analysis apparatus according to the second example embodiment.

Next, a configuration example of the analysis apparatus 41 is described with reference to FIG. 3. The configuration of each of the analysis apparatuses 51 and 61 is similar to that of the analysis apparatus 41, and thus the descriptions thereof are omitted.

The analysis apparatus 41 includes a communication unit 45 and a learning model generation unit 46. Each of the communication unit 45 and the learning model generation unit 46 may be software or a module, the processing of which is performed by a processor executing a program stored in a memory. Alternatively, the communication unit 45 and the learning model generation unit 46 may be hardware such as circuits or chips.

The communication unit 45 collects communication logs from the communication apparatuses 42 and 43 and other communication apparatuses (not shown). The communication log may be data that can be recognized or measured by the communication apparatus 42 and the like. The communication log may include, for example, the amount of data transmitted by the communication apparatus 42 and the like in a specific period, or the total amount of data transmitted in the past. Further, the communication log may include the amount of data loss, the amount of data that has been successfully transmitted or received, the amount of retransmitted data, the size of transmitted or received packets, and the like. Further, the communication log may include date information such as the date and time when the data was acquired, the date and time when the data was measured, and the date and time when the data was transmitted or received. The date information may include information for identifying a weekday, a holiday, a day of the week, and the like. The date and time when the data was acquired may be the date and time when the communication apparatus generated a communication log or the date and time when the analysis apparatus acquired the communication log. The date and time when the data was measured may be, for example, the date and time when the communication apparatus measured the data, or the date and time when another measurement apparatus different from the communication apparatus measured the data. Further, the communication log may include information about air temperature, weather, and the like at the time when the data was acquired. The communication unit 45 outputs the collected communication logs to the learning model generation unit 46.

The learning model generation unit 46 performs generation of attributes, generation of a learning model, measurement of an error rate of a generated learning model, and statistical processing using a communication log. Further, the learning model generation unit 46 generates a learning model and performs analysis processing using a communication log.

The generation of attributes performed by the learning model generation unit 46 is described below with reference to FIG. 4. The acquisition time indicates the time at which the communication apparatus 42 and the like generated, acquired, or measured data. Alternatively, the acquisition time may be the time at which the analysis apparatus 41 collected communication logs from the communication apparatuses 42 and 43 and the like. The traffic volume indicates a transmission rate at the acquisition time. Specifically, at 1:00, it is shown that the amount of data transmitted per second is 10 M(Mega)bits (10 Mbps: 10 Megabits per second). The same applies to other times.

Further, the air temperature indicates an air temperature at the acquisition time. For example, it is shown that the air temperature at 1:00 is 15° C. The traffic volume and the air temperature indicate items of the communication logs collected by the communication apparatus 42 and the like.

The traffic attribute indicates information about the result of generation of attributes using the traffic volume. For example, the traffic attribute indicates, with reference to the communication log at 2:00, a difference between the traffic volume at each time and the traffic volume at 2:00 which is the reference time. For example, the traffic attribute indicates that the traffic volume at 1:00 is 5 Mbps less than the traffic volume at 2:00. Further, the traffic attribute indicates that the traffic volume at 1:30 is 5 Mbps greater than the traffic volume at 2:00, and the traffic volume at 2:30 is 15 Mbps greater than the traffic volume at 2:00.

Further, the air temperature attribute indicates information about the result of generation of attributes using the air temperature information. For example, the air temperature attribute indicates, with reference to the temperature at 2:00, a difference between the temperature at each time and the temperature at 2:00 which is the reference time. For example, the temperature attribute indicates that the temperature at 1:00 is 5° C. lower than that at 2:00. Further, the temperature attribute indicates that the temperature at 1:30 is 2° C. lower than that at 2:00. Further, the temperature attribute indicates that the temperature at 2:30 is 5° C. lower than that at 2:00.

Information indicating a procedure or a method for generating attributes may be referred to as attribute information. Further, information obtained as a result of generation of attributes is referred to as an extended communication log in the following description. The generation of attributes is not limited to being performed using the traffic attribute and the temperature attribute and may be performed using other data. Further, it can be considered that the extended communication log obtained as a result of generation of attributes such as a traffic attribute and a temperature attribute is relative information indicating a relation with a certain reference value.

Generating a learning model may be generating a learning model for predicting future data using the extended communication log. For example, the learning model generation unit 46 may generate a learning model for predicting future traffic data using the traffic attribute. Alternatively, the learning model generation unit 46 may generate a learning model for predicting a future air temperature using the temperature attribute. Further, the learning model generation unit 46 may generate a learning model that specifies the relationship between the traffic volume and the air temperature using the traffic attribute and the temperature attribute.

For example, the learning model generation unit 46 may perform machine learning to calculate an extended communication log at a specified time as an objective variable using a plurality of extended communication logs as explanatory variables. An example of machine learning performed by the learning model generation unit 46 is described using the example shown in FIG. 4.

For example, the learning model generation unit 46 may perform machine learning using the extended communication log of the traffic attribute at 2:30 as the objective variable and the extended communication log of the traffic attribute at times other than 2:30 as the explanatory variables. Further, the learning model generation unit 46 compares a value obtained as a result of machine learning with the extended communication log of the traffic attribute at 2:30 shown in FIG. 4, and based on the result of this comparison, it calculates an error rate of the value obtained as a result of machine learning. That is, the learning model generation unit 46 compares an estimated value at 2:30 obtained as a result of machine learning with the extended communication log of the traffic attribute at 2:30 obtained based on the measured value. The learning model generation unit 46 calculates an error rate when a learning model generated by performing machine learning is used.

The learning model may include, for example, a plurality of learning models branched into a plurality of patterns using a conditional expression. In other words, the learning model may include a plurality of prediction expressions or a plurality of learning expressions branched into a plurality of patterns by using the conditional expression. The conditional expression may also be referred to as a gate function. The learning model may use a tree structure in order to indicate that the learning model includes a plurality of learning models or a plurality of prediction expressions branched into a plurality of patterns. The error rate may indicate an error rate for each learning model or may indicate an error rate for each prediction expression included in the learning model. Alternatively, the error rate may indicate an error rate of the entire learning model including a plurality of learning models.

The statistical processing using a communication log may be, for example, to obtain information or a value from a communication log or an extended communication log through a mathematically irreversible process. That is, it is assumed that a communication log or an extended communication log cannot be calculated from information or a value obtained as a result of statistical processing using a communication log. The above assumption that a communication log or an extended communication log cannot be calculated includes that a communication log or an extended communication log practically cannot be calculated since an enormous amount of calculation is required to calculate the communication log or the extended communication log. For example, as a result of statistical processing using a communication log, a value indicating a data loss rate or variations in the communication log may be calculated.

The learning model generation unit 46 transmits statistical information, attribute information, a learning model, an error rate of a generated learning model, and the items of the communication logs used for generation of the learning model to the control apparatus 30 via the communication unit 45.

Figure 5:
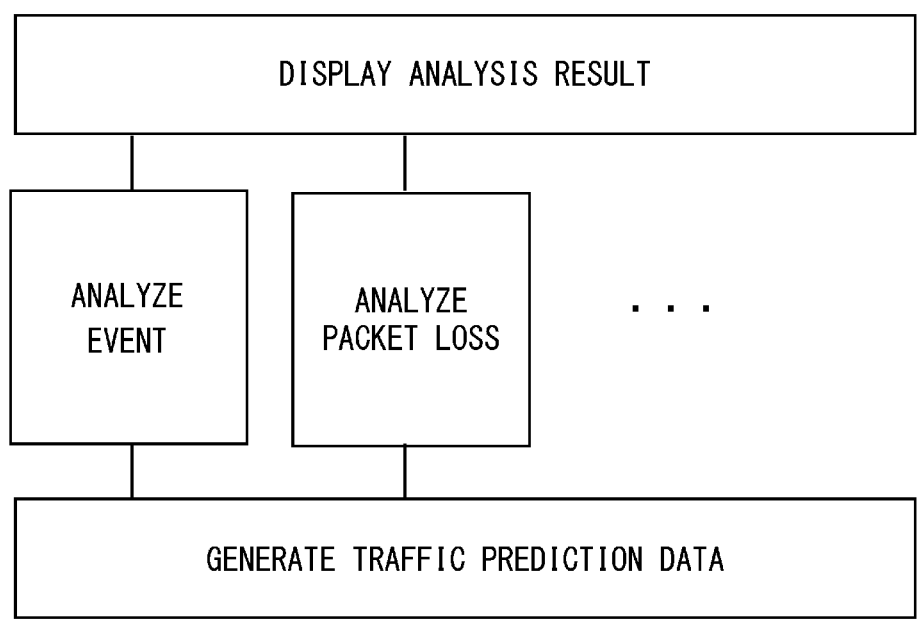
FIG. 5 is a diagram showing an outline of processing for analyzing a communication log performed by the learning model generation unit according to the second example embodiment.

Next, an outline of processing for analyzing a communication log performed by the learning model generation unit 46 is described with reference to FIG. 5. The processing for analyzing a communication log also includes processing for analyzing an extended communication log.

The learning model generation unit 46 performs machine learning using past traffic data to thereby generate a learning model. Further, the learning model generation unit 46 generates or calculates traffic prediction data using the learning model.

Further, the learning model generation unit 46 analyzes an event using the traffic prediction data. Alternatively, the learning model generation unit 46 analyzes a packet loss using the traffic prediction data. Further, the learning model generation unit 46 may perform other analyses. Examples of other analyses may include specifying, when a failure has occurred in the communication system, a method for dealing with the failure, and identifying, when a failure has occurred in the communication system, a cause of the failure.

The learning model generation unit 46 may execute processing in an application layer. That is, the learning model generation unit 46 may be an application that provides a service. The learning model generation unit 46 may output the analysis result to a monitor or the like.

Figure 6:
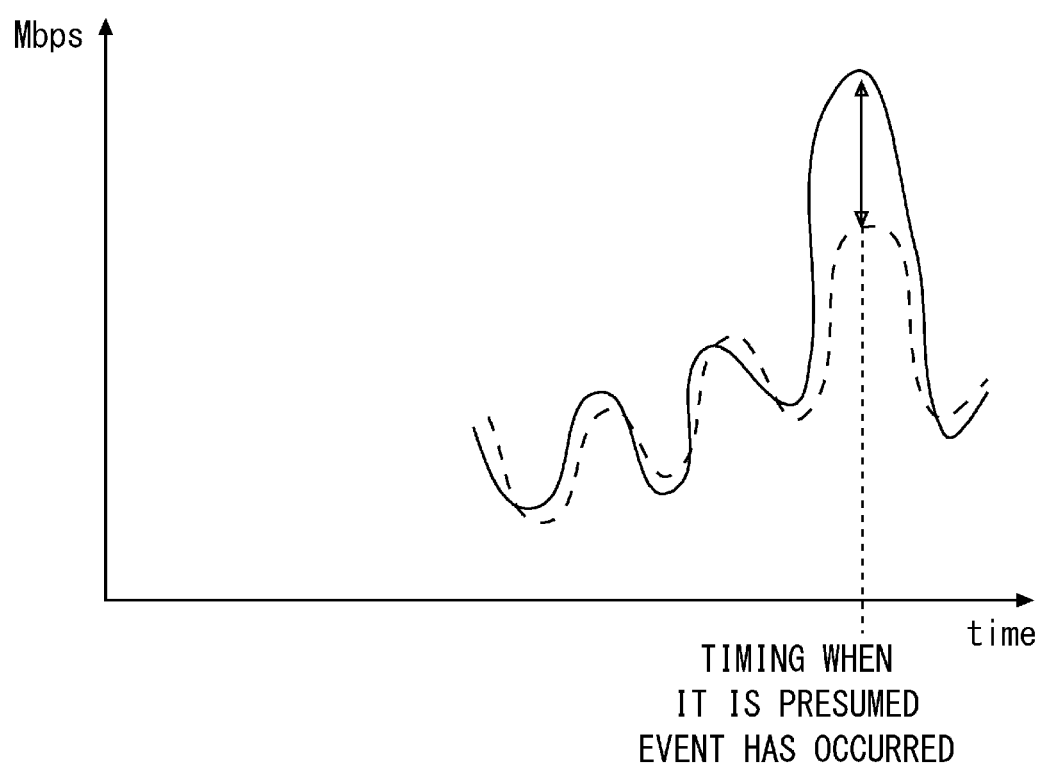
FIG. 6 is a diagram for explaining an analysis of an event performed by the learning model generation unit according to the second example embodiment.

Next, an analysis of an event is described in detail as an example of an analysis performed by the learning model generation unit 46 with reference to FIG. 6. The analysis of an event may be, for example, analyzing whether an event has occurred using traffic prediction data and traffic measurement data. The event may be, for example, watching sports, an election, an occurrence of a disaster, or an occurrence of a failure. The traffic measurement data may be included, for example, in the commutation logs collected from the communication apparatus 42 and the like.

The learning model generation unit 46 acquires, from the communication apparatus 42 and the like, for example, the traffic measurement data in a part or the entire period of the calculated traffic prediction data. That is, the learning model generation unit 46 uses, as input data, the traffic measurement data in a part or the entire period of the traffic prediction data. In FIG. 6, the vertical axis indicates an amount of traffic data in a predetermined period using Megabits per second (Mbps). Further, the horizontal axis indicates time. A curve indicated by a broken line indicates traffic prediction data. A curve shown by a solid line indicates traffic measurement data.

The learning model generation unit 46 compares the traffic prediction data with the traffic measurement data in the same period. The learning model generation unit 46 presumes that an event has occurred when the difference between the traffic prediction data and the traffic measurement data exceeds a predetermined threshold as a result of the comparison. Further, the learning model generation unit 46 may specify the content of the event that has occurred in accordance with the magnitude of the difference between the traffic prediction data and the traffic measurement data. For example, when the difference is larger than a Mbps (a is a positive value) and smaller than b Mbps (b is a positive value larger than a), the learning model generation unit 46 may determine that an event A has occurred. Further, when the difference is larger than b Mbps and smaller than c Mbps (c is a positive value larger than a), the learning model generation unit 46 may determine that an event B has occurred.

FIG. 6 shows the traffic prediction data and the traffic measurement data in the entire period of the traffic prediction data, but the traffic measurement data may be a part of the period of the traffic prediction data.

The threshold used to determine whether an event has occurred may be input, for example, by an administrator of the analysis apparatus 41 or a user thereof. Alternatively, the threshold used to determine whether an event has occurred may be calculated using statistical processing. For example, a standard deviation σ of traffic measurement data with respect to traffic prediction data may be used as a threshold used to determine whether an event has occurred. Alternatively, a value obtained by multiplying the standard deviation σ by a predetermined coefficient may be used as a threshold.

Alternatively, the learning model generation unit 46 may determine whether an event has occurred using machine learning. For example, the learning model generation unit 46 may use a prediction expression in which traffic prediction data and traffic measurement data are used as explanatory variables and the presence or absence of occurrence of events is used as an objective variable.

The result of the determination as to whether an event has occurred can be used in the future, for example, in order to discuss a configuration change in the communication system such as beefing up facilities when a similar event is likely to occur. That is, it can be considered that the result of the determination as to whether an event has occurred is information used to prompt a configuration change in the communication system.

Figure 7:
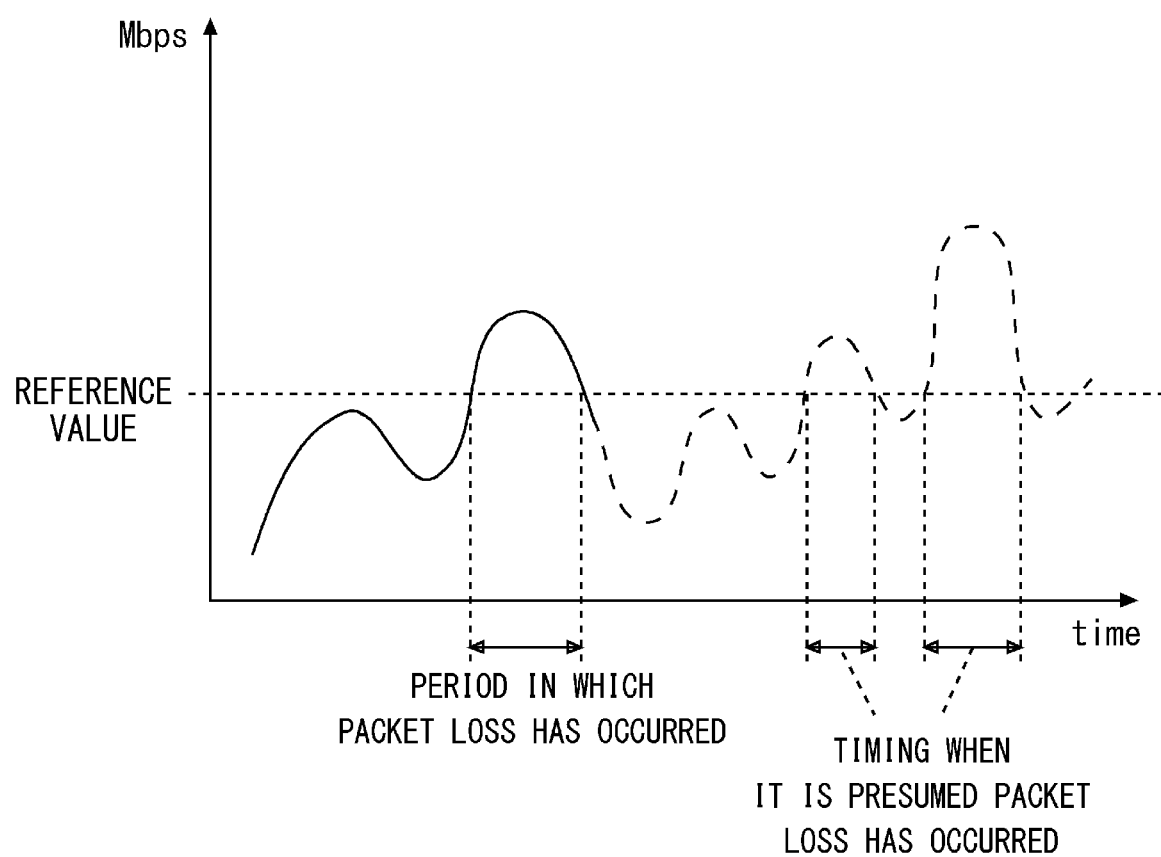
FIG. 7 is a diagram for explaining an analysis of a packet loss performed by the learning model generation unit according to the second example embodiment.

Next, an analysis of a packet loss is described in detail as an example of an analysis performed by the learning model generation unit 46 with reference to FIG. 7. The analysis of a packet loss may be, for example, predicting the occurrence time of a packet loss or the amount of a packet loss.

For example, the learning model generation unit 46 uses, as input data, data associating a period in which a packet loss has occurred in each of the communication apparatuses such as the communication apparatuses 42 and 43 with the amount of the traffic data in the period in which a packet loss has occurred. The learning model generation unit 46 collects input data used for an analysis from the communication apparatuses 42 and 43 and the like as communication logs.

In FIG. 7, the vertical axis indicates an amount of traffic data in a predetermined period using Megabits per second (Mbps). Further, the horizontal axis indicates time. A curve indicated by a broken line indicates traffic prediction data. A curve indicated by a solid line indicates past traffic measurement data in a period before the period of the traffic prediction data.

Further, a reference value indicates the amount of traffic data at the timing when a packet loss has occurred in the past.

The learning model generation unit 46 compares the traffic prediction data with the reference value. The learning model generation unit 46 may predict, as a period in which a packet loss occurs, a period in which traffic exceeding a reference value is predicted to occur. In FIG. 7, two periods are predicted as periods in which a packet loss occurs. Further, the learning model generation unit 46 may predict the amount of a packet loss in a period in which the packet loss is predicted to occur based on the relation between the amount of the packet loss when the packet loss has occurred in the past and the amount of the traffic data. The learning model generation unit 46 may determine the relationship between the amount of the packet loss when the packet loss has occurred in the past and the amount of the traffic data using machine learning or the like.

As a reference value used to predict a period in which a packet loss occurs, for example, the standard deviation σ related to the amount of the past traffic data calculated using statistical processing may be used. Alternatively, a value obtained by multiplying the standard deviation σ by a predetermined coefficient may be used as a threshold.

Alternatively, the learning model generation unit 46 may predict a period in which a packet loss occurs using machine learning. For example, the analysis unit 12 may use a prediction expression in which the amount of the past traffic data and the timing at which a packet loss has occurred are used as explanatory variables and the period in which a packet loss occurs is used as an objective variable.

The result of the determination regarding the period in which a packet loss occurs can be used in the future, for example, in order to discuss a configuration change in the communication system such as beefing up facilities or a change of the communication path before the period that is predicted as a period in which a packet loss occurs. That is, it can be considered that the result of the determination regarding the period in which a packet loss occurs is information used to prompt a configuration change in the communication system.

Figure 8:
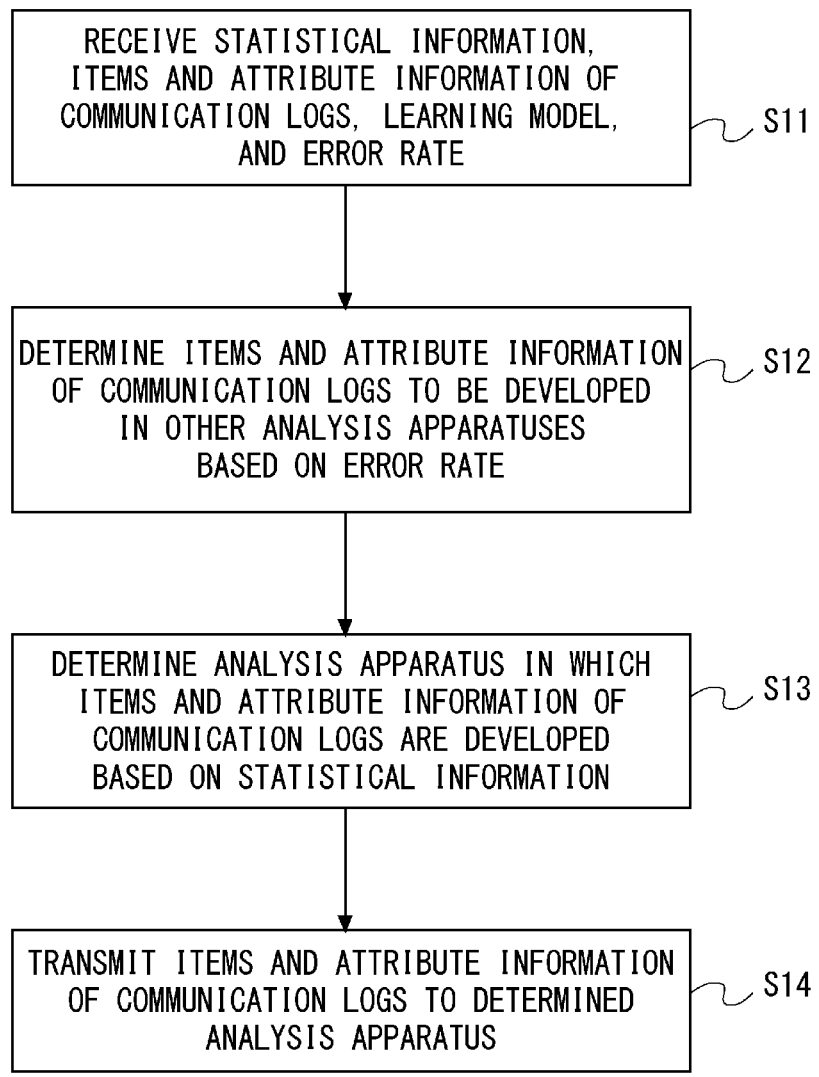
FIG. 8 is a diagram showing a flow of processing in which a control apparatus according to the second example embodiment determines an analysis apparatus in which information about a learning model is developed.

Next, a flow of processing in which the control apparatus 30 determines an analysis apparatus in which the information about a learning model generated in the analysis apparatus 41 is developed is described with reference to FIG. 8. First, the communication unit 31 receives, from the analysis apparatus 41, statistical information, attribute information, a learning model, an error rate of the learning model, and items of the communication logs collected by the analysis apparatus 41 (S11). Further, the communication unit 31 receives statistical information from the analysis apparatuses 51 and 61 and the like other than the analysis apparatus 41 (S11). The communication unit 31 may also receive attribute information, a learning model, an error rate of the learning model, and items of the communication logs from the analysis apparatuses 51 and 61 and the like (S11).

Next, the determination unit 32 determines the items and the attribute information of the communication logs to be developed in the analysis apparatuses 51 and 61 and the like based on the error rate of the learning model received from the analysis apparatus 41 (S12). For example, the determination unit 32 determines that information about the learning model of which the error rate is lower than a predetermined threshold among a plurality of learning models received from the analysis apparatus 41 is developed in other analysis apparatuses. Alternatively, the determination unit 32 may determine to develop information about the learning model having, with regard to the above predetermined threshold, the lowest error rate in other analysis apparatuses. The information about the learning model includes the items and the attribute information of the communication logs used when the learning model is generated.

Next, the determination unit 32 determines, based on the statistical information received from the analysis apparatuses 41, 51 and 61 and the like, an analysis apparatus in which the information about the learning model is developed (S13). For example, the determination unit 32 compares the statistical information received from the analysis apparatus 41 with the statistical information received from the analysis apparatus 51.

Specifically, the determination unit 32 may calculate a difference between the statistical information received from the analysis apparatus 41 and the statistical information received from the analysis apparatus 51. The determination unit 32 determines whether the result of the comparison, such as the difference between the statistical information received from the analysis apparatus 41 and the statistical information received from the analysis apparatus 51, satisfies a predetermined reference. If the result of the comparison satisfies a predetermined reference, the determination unit 32 determines the analysis apparatus 51 to be an analysis apparatus in which the items and the attribute information of the communication logs determined in Step S12 is developed. For example, the determination unit 32 may determine that the result of the comparison satisfies the predetermined reference when the aforementioned difference is less than a predetermined value. The case in which the result of the comparison satisfies the predetermined reference is also referred to as the case in which the statistical information generated by the analysis apparatus 51 indicates a tendency similar to that of the statistical information generated by the analysis apparatus 41. The determination unit 32 executes the processing in Step S13 not only for the analysis apparatus 51 but also for an analysis apparatus such as the analysis apparatus 61 that has transmitted the statistical information.

The communication unit 31 transmits the items and the attribute information of the communication logs determined in Step S12 to the analysis apparatus determined in Step S13 (S14).

Figure 9:
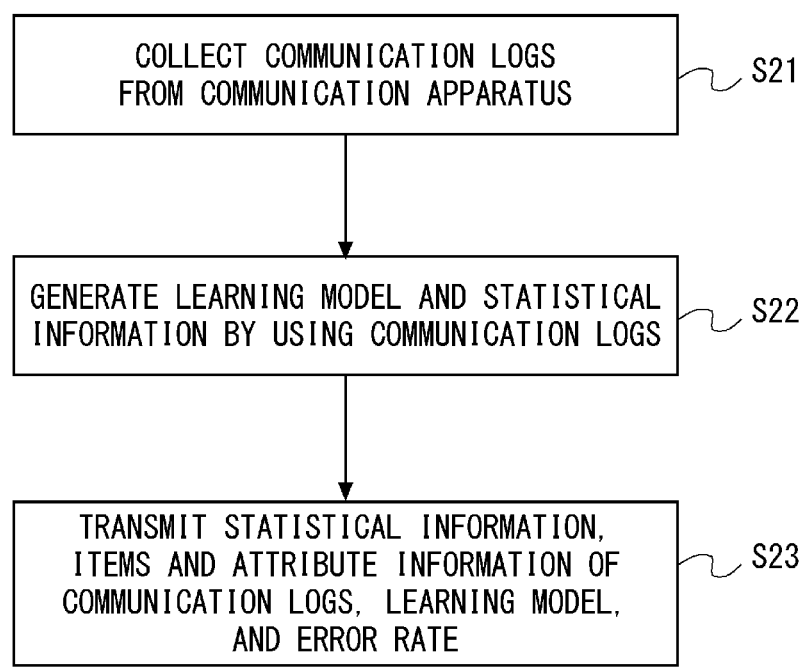
FIG. 9 is a diagram showing a flow of processing for generating a learning model using a communication log performed by an analysis apparatus according to the second example embodiment.

Next, a flow of processing for generating a learning model using communication logs performed by the analysis apparatus 41 is described with reference to FIG. 9. First, the communication unit 45 collects communication logs from the communication apparatuses 42 and 43 and the like (S21). Next, the learning model generation unit 46 performs machine learning using the communication logs to thereby generate a learning model (S22). Further, the learning model generation unit 46 executes statistical processing using the communication logs (S22). The learning model generation unit 46 also calculates an error rate about the generated learning model after generating the learning model.

Next, the communication unit 45 transmits the generated learning model, the items and the attribute information of the communication logs used for the learning model, the error rate of the learning model, and the statistical information to the control apparatus 30 (S23).

As described above, the control apparatus 30 can determine, for example, based on the error rate of the learning model generated by the analysis apparatus 41, whether to develop the information about the learning model in other analysis apparatuses. Further, the control apparatus 30 can determine, based on the statistical information received from the analysis apparatuses 41, 51, and 61 and the like, an analysis apparatus in which the information about the learning model determined to be developed is developed.

By developing the items and the attribute information of the communication logs used by the analysis apparatus 41 that has generated a learning model having a low error rate, it is possible for other analysis apparatuses to efficiently generate a learning model having a low error rate. It should be noted that the control apparatus 30 can determine to develop the items and the attribute information of the communication logs in analysis apparatuses other than the analysis apparatus 41 that have generated statistical information indicating a tendency similar to that of the statistical information generated by the analysis apparatus 41. As a result, it is possible to increase the possibility of generating a learning model having an error rate similar to that of the analysis apparatus 41 in analysis apparatuses other than the analysis apparatus 41.

Modified Example

In the communication system shown in FIG. 2, for example, the communication systems 40, 50, and 60 and the control apparatus 30 may be managed in accordance with policies different from each other. For example, the communication systems 40, 50, and 60 and the control apparatus 30 may be located in countries different from each other. When the communication system 40 and the control apparatus 30 are located in countries different from each other and are managed in accordance with Policies different from each other, data transmitted by the communication systems 40, 50, and 60 to the control apparatus 30 may be limited. For example, limitations may be imposed in which the communication systems 40, 50, and 60 cannot transmit communication logs to the control apparatus 30.

Even in such a case, the control apparatus 30 can determine where to develop the information about a learning model based on statistical information without using communication logs of the communication systems 40, 50, and 60. The statistical information is generated through an irreversible process. That is, a communication log cannot be generated from the statistical information. Therefore, even in a situation in which each communication system cannot transmit a communication log to the control apparatus 30, the control apparatus 30 is highly likely to be able to receive the statistical information from each communication system.

As described above, even when the data obtained from the communication system 40 is limited, the control apparatus 30 can determine where to develop the information about the learning model by using the statistical information.

Further, in the second example embodiment and the modification example thereof, the control apparatus 30 does not need to analyze an enormous number of communication logs collected by the analysis apparatuses 41, 51, and 61 and the like to thereby determine, for example, where to develop information about the learning model of the analysis apparatus 41. That is, the control apparatus 30 may determine where to develop the information about the learning model of the analysis apparatus 41 by using the statistical information generated by the analysis apparatus 41. Therefore, the control apparatus 30 can execute processing having a lower load than that when an enormous number of communication logs are analyzed.

Further, each of the analysis apparatuses 41, 51, and 61 does not need to transmit an enormous number of communication logs to the control apparatus 30 and transmits only statistical information to the control apparatus 30. Thus, it is possible to reduce an amount of data to be transmitted so that it is less than that when an enormous number of communication logs are transmitted between each analysis apparatus and the control apparatus 30.

Figure 10:
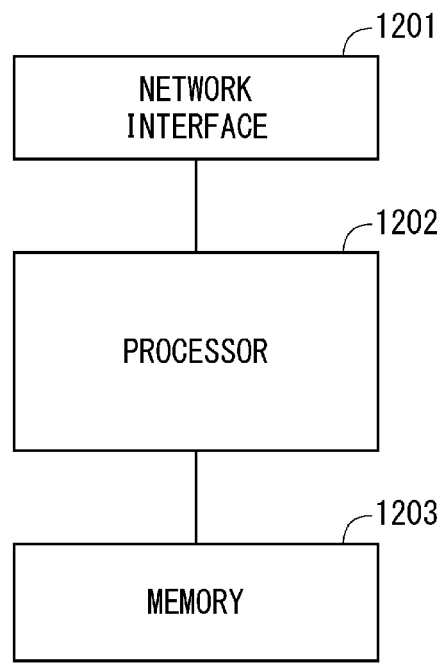
FIG. 10 is a configuration diagram of each of the analysis apparatuses and the control apparatus in each example embodiments.

FIG. 10 is a block diagram showing a configuration example of each of the analysis apparatuses 10 and 20 (hereinafter referred to as the analysis apparatus 10 and the like) and the control apparatus 30 described in the above example embodiments. The analysis apparatus 10 and the like may be the analysis apparatuses 41, 51, and 61. Referring to FIG. 10, it is seen that each of the analysis apparatus 10 and the like and the control apparatus 30 includes a network interface 1201, a processor 1202, and a memory 1203. The network interface 1201 is used to communicate with another network node apparatus that configures a communication system. The network interface 1201 may include, for example, a network interface card (NIC) conforming to the IEEE 802.3 series.

The processor 1202 loads software (computer programs) from the memory 1203 and executes the loaded software (computer programs) to perform processing of the analysis apparatus 10 or 20 described with reference to the sequence diagrams and the flowcharts in the above example embodiments. The processor 1202 may be, for example, a microprocessor, a Micro Processing Unit (MPU), or a Central Processing Unit (CPU). The processor 1202 may include a plurality of processors.

The memory 1203 is composed of a combination of a volatile memory and a non-volatile memory. The memory 1203 may include a storage located apart from the processor 1202. In this case, the processor 1202 may access the memory 1203 via an I/O interface (not shown).

In the example shown in FIG. 10, the memory 1203 is used to store software modules. The processor 1202 may load these software modules from the memory 1203 and execute the loaded software modules, thereby performing the processing of the analysis apparatus 10 and the like and the control apparatus 30 described in the above example embodiments.

As described with reference to FIG. 10, each of the processors included in the analysis apparatus 10 and the like and the control apparatus 30 executes one or a plurality of programs including instructions to cause a computer to perform the algorithm described with reference to the drawings.

In the above examples, the program(s) can be stored and provided to a computer using any type of non-transitory computer readable media. Non-transitory computer readable media include any type of tangible storage media. Examples of non-transitory computer readable media include magnetic storage media (e.g., flexible disks, magnetic tapes, and hard disk drives), optical magnetic storage media (e.g., magneto-optical disks). Further, examples of non-transitory computer readable media include CD-ROM (Read Only Memory), CD-R, and CD-R/W. Further, examples of non-transitory computer readable media include semiconductor memories. The semiconductor memories include, for example, mask ROM, PROM (Programmable ROM), EPROM (Erasable PROM), flash ROM, RAM (Random Access Memory), etc. Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and can be modified as appropriate without departing from the spirit of the present disclosure. Further, the present disclosure may be executed by combining the example embodiments as appropriate.

While the present invention has been described with reference to the example embodiments, the present invention is not limited to the aforementioned example embodiments. Various changes that can be understood by those skilled in the art can be made to the configurations and the details of the present invention within the scope of the present invention.

This application is based upon and claims the benefit of priority from Japanese patent application No. 2017-235194, filed on Dec. 7, 2017, the disclosure of which is incorporated herein in its entirety by reference.

Further, the whole or part of the example embodiments disclosed above can be described as, but not limited to, the following supplementary notes.

(Supplementary Note 1)

A control apparatus comprising:

a communication unit configured to receive, from a first analysis apparatus configured to perform machine learning using communication logs collected from a communication apparatus in order to generate a learning model, statistical information about each of the communication logs and information about the learning model; and a determination unit configured to determine a second analysis apparatus to which the information about the learning model is applied based on the statistical information.

(Supplementary Note 2)

The control apparatus described in Supplementary Note 1, wherein the communication unit receives, from the second analysis apparatus, statistical information about communication logs used when the second analysis apparatus performs machine learning, and the determination unit determines, when a result of a comparison between the statistical information received from the first analysis apparatus and the statistical information received from the second analysis apparatus satisfies a predetermined reference, the second analysis apparatus to be an analysis apparatus to which the information about the learning model is applied.

(Supplementary Note 3)

The control apparatus described in Supplementary Note 1 or 2, wherein the information about the learning model includes an item of each of the communication logs, attribute information of each of the communication logs, the generated learning model, and an error rate of the learning model.

(Supplementary Note 4)

The control apparatus described in Supplementary Note 3, wherein when the error rate is lower than a predetermined threshold, the determination unit determines to apply, to the second analysis apparatus, the item of each of the communication logs and the attribute information of each of the communication logs that have been used to generate the learning model associated with the error rate.

(Supplementary Note 5)

The control apparatus described in Supplementary Note 3 or 4, wherein the error rate of the learning model is a result of comparing a result derived by using the learning model with each of the communication logs.

(Supplementary Note 6)

The control apparatus described in any one of Supplementary Notes 1 to 5, wherein the statistical information is irreversible so that it cannot be converted into the communication log.

(Supplementary Note 7)

An analysis apparatus comprising:

a learning model generation unit configured to perform machine learning using collected communication logs to thereby generate a learning model; and a communication unit configured to transmit, to a control apparatus configured to determine an analysis apparatus to which information about the learning model is applied based on statistical information about each of the communication logs, the statistical information and the information about the learning model.

(Supplementary Note 8)

The analysis apparatus described in Supplementary Note 7, wherein the information about the learning model includes an item of each of the communication logs, attribute information of each of the communication logs, the generated learning model, and an error rate of the learning model.

(Supplementary Note 9)

A communication system comprising:

a first analysis apparatus configured to perform machine learning using collected communication logs to thereby generate a learning model; and a control apparatus configured to receive statistical information about each of the communication logs and information about the learning model from the first analysis apparatus and determine a second analysis apparatus to which the information about the learning model is applied based on the statistical information.

(Supplementary Note 10)

The communication system described in Supplementary Note 9, wherein when the control apparatus receives, from the second analysis apparatus, statistical information about communication logs used when the second analysis apparatus performs machine learning, and the statistical information received from the first analysis apparatus and the statistical information received from the second analysis apparatus satisfy a predetermined reference, the control apparatus determines the second analysis apparatus to be an analysis apparatus to which the information about the learning model is applied.

(Supplementary Note 11)

A data processing method comprising:

receiving, from a first analysis apparatus that has performed machine learning using communication logs collected from a communication apparatus to thereby generate a learning model, statistical information about each of the communication logs and information about the learning model; and determining a second analysis apparatus to which the information about the learning model is applied based on the statistical information.

(Supplementary Note 12)

The data processing method described in Supplementary Note 11, further comprising:

receiving statistical information about communication logs used when the second analysis apparatus performs machine learning from the second analysis apparatus before the second analysis apparatus to which the information about the learning model is applied is determined; and determining, when the statistical information received from the first analysis apparatus and the statistical information received from the second analysis apparatus satisfy a predetermined reference at the time of determining the second analysis apparatus to which the information about the learning model is applied, the second analysis apparatus to be an analysis apparatus to which the information about the learning model is applied.

(Supplementary Note 13)

A data transmission method comprising:

performing machine learning using collected communication logs to thereby generate a learning model; and transmitting, to a control apparatus configured to determine an analysis apparatus to which information about the learning model is applied based on statistical information about each of the communication logs, the statistical information and the information about the learning model.

(Supplementary Note 14)

The data transmission method described in Supplementary Note 13, wherein the information about the learning model includes an item of each of the communication logs, attribute information of each of the communication logs, the generated learning model, and an error rate of the learning model.

(Supplementary Note 15)

A program causing a computer to perform the following processing of:

receiving, from a first analysis apparatus that has generated a learning model as a result of machine learning using communication logs collected from a communication apparatus, statistical information about each of the communication logs and information about the learning model; and determining a second analysis apparatus to which the information about the learning model is applied based on the statistical information.

(Supplementary Note 16)

The program described in Supplementary Note 15, further causing the computer to perform the following processing of:

receiving statistical information about communication logs used when the second analysis apparatus performs machine learning from the second analysis apparatus before the second analysis apparatus to which the information about the learning model is applied is determined; and determining, when the statistical information received from the first analysis apparatus and the statistical information received from the second analysis apparatus satisfy a predetermined reference at the time of determining the second analysis apparatus to which the information about the learning model is applied, the second analysis apparatus to be an analysis apparatus to which the information about the learning model is applied.

(Supplementary Note 17)

A program causing a computer to perform the following processing of:

generating a learning model as a result of machine learning using collected communication logs; and transmitting, to a control apparatus configured to determine an analysis apparatus to which information about the learning model is applied based on statistical information about each of the communication logs, the statistical information and the information about the learning model.

(Supplementary Note 18)

The program described in Supplementary Note 17, wherein the information about the learning model includes an item of each of the communication logs, attribute information of each of the communication logs, the generated learning model, and an error rate of the learning model.

REFERENCE SIGNS LIST

10 ANALYSIS APPARATUS
20 ANALYSIS APPARATUS
30 CONTROL APPARATUS
31 COMMUNICATION UNIT
32 DETERMINATION UNIT
40 COMMUNICATION SYSTEM
41 ANALYSIS APPARATUS
42 COMMUNICATION APPARATUS
43 COMMUNICATION APPARATUS
45 COMMUNICATION UNIT
46 LEARNING MODEL GENERATION UNIT
50 COMMUNICATION SYSTEM
51 ANALYSIS APPARATUS
52 COMMUNICATION APPARATUS
53 COMMUNICATION APPARATUS
60 COMMUNICATION SYSTEM
61 ANALYSIS APPARATUS
62 COMMUNICATION APPARATUS
63 COMMUNICATION APPARATUS

What is claimed is:

1. A control apparatus comprising:

at least one memory storing instructions, and at least one processor configured to execute the instructions to;

receive, from a first analysis apparatus configured to perform machine learning using communication logs collected from a communication apparatus in order to generate a learning model, statistical information about each of the communication logs and information about the learning model; and determine a second analysis apparatus to which the information about the learning model is applied based on the statistical information, wherein the statistical information is irreversible so that the statistical information cannot be converted into the communication log.

2. The control apparatus according to claim 1, wherein the at least one processor is further configured to execute the instructions to receive, from the second analysis apparatus, statistical information about communication logs used when the second analysis apparatus performs machine learning, and determine, when a result of a comparison between the statistical information received from the first analysis apparatus and the statistical information received from the second analysis apparatus satisfies a predetermined reference, the second analysis apparatus to be an analysis apparatus to which the information about the learning model is applied.

3. The control apparatus according to claim 1, wherein the information about the learning model includes an item of each of the communication logs, attribute information of each of the communication logs, the generated learning model, and an error rate of the learning model.

4. The control apparatus according to claim 3, wherein the at least one processor is further configured to execute the instructions to, when the error rate is lower than a predetermined threshold, determine to apply, to the second analysis apparatus, the item of each of the communication logs and the attribute information of each of the communication logs that have been used to generate the learning model associated with the error rate.

5. The control apparatus according to claim 3, wherein the error rate of the learning model is a result of comparing a result derived by using the learning model with each of the communication logs.

6. An analysis apparatus comprising:
at least one memory storing instructions, and
at least one processor configured to execute the instructions to;
perform machine learning using collected communication logs to thereby generate a learning model; and
transmit, to a control apparatus configured to determine an analysis apparatus to which information about the learning model is applied based on statistical information about each of the communication logs, the statistical information and the information about the learning model, wherein
the statistical information is irreversible so that the statistical information cannot be converted into the communication log.

7. The analysis apparatus according to claim 6, wherein the information about the learning model includes an item of each of the communication logs, attribute information of each of the communication logs, the generated learning model, and an error rate of the learning model.

8. A communication system comprising:
a first analysis apparatus; and
a control apparatus;
wherein the first analysis apparatus comprises;
at least one memory storing instructions, and
at least one processor configured to execute the instructions to;
perform machine learning using collected communication logs to thereby generate a learning model;
wherein the control apparatus comprises;
at least one memory storing instructions, and
at least one processor configured to execute the instructions to;
receive statistical information about each of the communication logs and information about the learning model from the first analysis apparatus and determine a second analysis apparatus to which the information about the learning model is applied based on the statistical information, wherein
the statistical information is irreversible so that the statistical information cannot be converted into the communication log.

9. The communication system according to claim 8, wherein the at least one processor of the control apparatus is further configured to execute the instructions to, when the control apparatus receives, from the second analysis apparatus, statistical information about communication logs used when the second analysis apparatus performs machine learning, and the statistical information received from the first analysis apparatus and the statistical information received from the second analysis apparatus satisfy a predetermined reference, determine the second analysis apparatus to be an analysis apparatus to which the information about the learning model is applied.

10. A data processing method comprising:
receiving, from a first analysis apparatus that has performed machine learning using communication logs collected from a communication apparatus to thereby generate a learning model, statistical information about each of the communication logs and information about the learning model; and
determining a second analysis apparatus to which the information about the learning model is applied based on the statistical information, wherein
the statistical information is irreversible so that the statistical information cannot be converted into the communication log.

11. The data processing method according to claim 10, further comprising:
receiving statistical information about communication logs used when the second analysis apparatus performs machine learning from the second analysis apparatus before the second analysis apparatus to which the information about the learning model is applied is determined; and
determining, when the statistical information received from the first analysis apparatus and the statistical information received from the second analysis apparatus satisfy a predetermined reference at the time of determining the second analysis apparatus to which the information about the learning model is applied, the second analysis apparatus to be an analysis apparatus to which the information about the learning model is applied.

12. A data transmission method comprising:
performing machine learning using collected communication logs to thereby generate a learning model; and
transmitting, to a control apparatus configured to determine an analysis apparatus to which information about the learning model is applied based on statistical information about each of the communication logs, the statistical information and the information about the learning model, wherein
the statistical information is irreversible so that the statistical information cannot be converted into the communication log.

13. The data transmission method according to claim 12, wherein the information about the learning model includes an item of each of the communication logs, attribute information of each of the communication logs, the generated learning model, and an error rate of the learning model.

14. A non-transitory computer readable medium storing a program causing a computer to perform the following processing of:
receiving, from a first analysis apparatus that has generated a learning model as a result of machine learning using communication logs collected from a communication apparatus, statistical information about each of the communication logs and information about the learning model; and
determining a second analysis apparatus to which the information about the learning model is applied based on the statistical information, wherein
the statistical information is irreversible so that the statistical information cannot be converted into the communication log.

15. The non-transitory computer readable medium storing the program according to claim 14, further causing the computer to perform the following processing of:
receiving statistical information about communication logs used when the second analysis apparatus performs machine learning from the second analysis apparatus before the second analysis apparatus to which the information about the learning model is applied is determined; and
determining, when the statistical information received from the first analysis apparatus and the statistical information received from the second analysis apparatus satisfy a predetermined reference at the time of determining the second analysis apparatus to which the information about the learning model is applied, the second analysis apparatus to be an analysis apparatus to which the information about the learning model is applied.

16. A non-transitory computer readable medium storing a program causing a computer to perform the following processing of:
generating a learning model as a result of machine learning using collected communication logs; and
transmitting, to a control apparatus configured to determine an analysis apparatus to which information about the learning model is applied based on statistical information about each of the communication logs, the statistical information and the information about the learning model, wherein
the statistical information is irreversible so that the statistical information cannot be converted into the communication log.

17. The non-transitory computer readable medium storing the program according to claim 16, wherein the information about the learning model includes an item of each of the communication logs, attribute information of each of the communication logs, the generated learning model, and an error rate of the learning model.

* * * * *